(12) United States Patent
Benco et al.

(10) Patent No.: US 8,504,635 B2
(45) Date of Patent: Aug. 6, 2013

(54) METHOD AND APPARATUS FOR IMS SUPPORT FOR MULTIMEDIA SESSION, RECORDING, ANALYSIS AND STORAGE

(75) Inventors: David S. Benco, Winfield, IL (US); Michael J. Hawley, Naperville, IL (US); Anne Y. Lee, Naperville, IL (US)

(73) Assignee: Alcatel Lucent, Paris (FR)

( * ) Notice: Subject to any disclaimer, the term of this patent is extended or adjusted under 35 U.S.C. 154(b) by 922 days.

(21) Appl. No.: 12/150,418

(22) Filed: Apr. 28, 2008

(65) Prior Publication Data

US 2009/0271469 A1 Oct. 29, 2009

(51) Int. Cl.
*G06F 15/16* (2006.01)

(52) U.S. Cl.
USPC ........ 709/207; 370/260; 455/456.1; 455/464; 455/512

(58) Field of Classification Search
USPC ........................ 709/207; 455/456.1, 464, 521
See application file for complete search history.

(56) References Cited

U.S. PATENT DOCUMENTS

| | | | | |
|---|---|---|---|---|
| 5,844,522 A * | 12/1998 | Sheffer et al. | ................ | 342/457 |
| 6,650,901 B1 * | 11/2003 | Schuster et al. | ........... | 455/456.1 |
| 7,474,633 B2 * | 1/2009 | Halbraich et al. | ............ | 370/259 |
| 7,616,835 B2 * | 11/2009 | Lobregt | ........................ | 382/294 |
| 7,719,414 B1 * | 5/2010 | Smith et al. | ................... | 340/525 |
| 7,986,914 B1 * | 7/2011 | Henry et al. | ................. | 455/3.06 |
| 8,135,378 B2 * | 3/2012 | Yasrebi et al. | ............ | 455/404.1 |
| 8,160,540 B2 * | 4/2012 | Faccin et al. | ............... | 455/404.1 |
| 8,190,118 B2 * | 5/2012 | Sennett et al. | ............ | 455/404.1 |
| 2003/0050737 A1 * | 3/2003 | Osann, Jr. | ..................... | 700/276 |
| 2003/0224781 A1 * | 12/2003 | Milford et al. | ............. | 455/426.1 |
| 2005/0134691 A1 * | 6/2005 | Cox | ......... | 348/207.99 |
| 2007/0136743 A1 * | 6/2007 | Hasek et al. | .................... | 725/33 |
| 2008/0095098 A1 * | 4/2008 | McNamara et al. | ......... | 370/328 |
| 2009/0193131 A1 * | 7/2009 | Shi | ................ | 709/229 |
| 2010/0124897 A1 * | 5/2010 | Edge | .......................... | 455/404.1 |
| 2010/0228826 A1 * | 9/2010 | Marlow et al. | ............... | 709/204 |
| 2011/0076982 A1 * | 3/2011 | Li et al. | ..................... | 455/404.1 |
| 2012/0307989 A1 * | 12/2012 | Hawley et al. | ............ | 379/93.01 |

\* cited by examiner

*Primary Examiner* — Tauqir Hussain
(74) *Attorney, Agent, or Firm* — Carmen Patti Law Group, LLC

(57) ABSTRACT

A system comprising a first network element, a second network element and a communication device. The first network element is communicatively coupled to the second network element and the communication device. The communication device sends multimedia session information to the first network element. The first network element analyzes the multimedia session information for urgent emergency circumstances. The first network element forwards the multimedia session information to a destination on the second network element if urgent emergency circumstances are found in the multimedia session information.

20 Claims, 3 Drawing Sheets

METHOD AND APPARATUS FOR IMS SUPPORT FOR MULTIMEDIA SESSION, RECORDING, ANALYSIS AND STORAGE

TECHNICAL FIELD

The present invention is directed to a method and system for IMS support for multimedia session, recording, analysis and storage.

BACKGROUND

In recent years, subscribers' use of cell phones has become more common. People carry their cell phones most everywhere they go. At the same time the capabilities of cell phones have markedly increased. Cell phones can now pass data, photographs, video, as well as other media. Subscribers commonly use their phones to send pictures and videos of events as they happen.

In a different arena, government agencies at the national and local levels are under increased pressure to reduce costs and maintain public services to taxpayers. Additionally, in the post 9/11 era, local law enforcement and homeland security agencies rely upon ordinary citizens to observe and report suspicious behavior or circumstances. Given the need for heightened security and the pressure to meet budget constraints, law enforcement and homeland security agencies would benefit from citizens participation in identifying threats as they occurred. Although a voice description of suspicious activities is good, the information provided by video, pictures and voice would be of greater assistance to local law enforcement authorities. Video and photographs provide an actual objective view of a perceived threat as opposed to a third person's voice interpretation of the threat. By analyzing recently obtained video, law enforcement officials may be able to decipher and immediately act upon real threats. Furthermore, multimedia phones may be used to capture municipal repair needs that may go unnoticed. For example, a motorist on a remote road may be able to provide to authorities immediate video evidence of a dangerous situation, such as, a large pothole, a downed power line or a fallen tree blocking a road. Authorities may be able to act promptly to rectify problem. Once again, authorities will have a picture or video of the problem that will provide authorities with greater information than a third person's description of the problem.

Thus a need exists for a way to provide mobile subscribers a way to inform local police, security, and municipal authorities of real-time events using video, pictures and/or voice.

SUMMARY

A system comprising a first network element, a second network element and a communication device. The first network element is communicatively coupled to the second network element and the communication device. The communication device sends multimedia session information to the first network element. The first network element analyzes the multimedia session information for urgent emergency circumstances. The first network element forwards the multimedia session information to a destination on the second network element if urgent emergency circumstances are found in the multimedia session information.

A method in another application, the method comprising the steps of handling a session initiation protocol invite message, receiving multimedia session information, analyzing the multimedia session information, sending the multimedia session information to a municipal security video monitoring storage archive facility, and archiving the multimedia session information.

DESCRIPTION OF THE DRAWINGS

Features of example implementations of the invention will become apparent from the description, the claims and the accompanying drawings in which:

DETAILED DESCRIPTION

Internet Protocol Multimedia Subsystem (IMS) architecture specifies an open architectural framework designed to provide Internet Protocol (IP) multimedia services support for mobile devices. The open architecture is meant to provide a development environment where non-standard IP applications may be created. The IMS open architecture may support applications that provide video, picture, text, voice, as well as other types of media between end users. Thus the IMS open architecture may be used as an platform for IMS support for multimedia session recording, analysis and storage.

Figure 1:
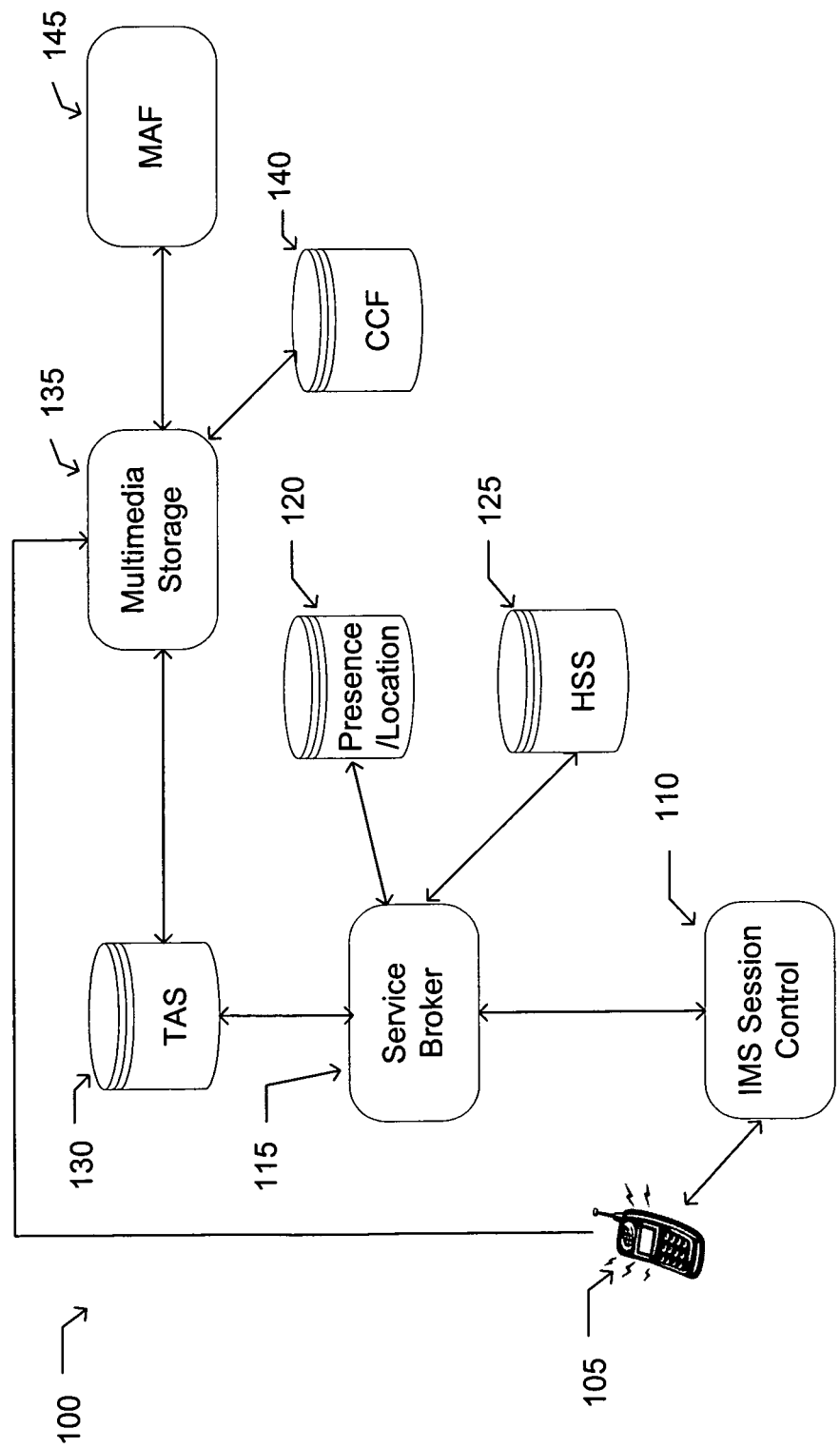
FIG. 1 is a diagram of a system that may be used to provide IMS support for multimedia session recording, analysis and storage.

Turning to FIG. 1, which is a network diagram 100 of a network architecture that may be based on an IMS open architecture and may provide IMS support for multimedia session recording, analysis and storage. The network 100 may be composed of many elements or nodes that are used to gather and store information obtained in a multimedia session that may be related to report suspicious or dangerous activities to authorities.

A part of the network 100 is the user equipment (UE), mobile device or communication device 105. A communication device 105 may be a cell phone, a personal communication device, a landline phone, or any other equipment that may be used to establish a communication session with another communication device. In the network 100, the communication device 105 may establish a multimedia connection using session initiation protocol (SIP) signaling.

The SIP signaling initiated by the communication device 105 may be routed through the network 100 via an IMS session control (IMS-SC) node 110. The IMS-SC 110 may act as a SIP signaling entry into the network 100. The communication device 105 may send SIP signaling messages that are routed to the IMS-SC 110. The IMS-SC 110 may then further route these messages into the network 100.

The IMS-SC 110 may be communicatively coupled with a service broker 115. The IMS-SC 110 may send SIP signaling messages to the service broker 115. The service broker 115 may perform service capability interaction and provide blended services in the network 100. The service broker 115 may also be communicatively coupled with a presence/location server 120 and a home subscriber server (HSS) 125. The presence/location server 120 may provide geo-location information of the location of the communication device 105. The HSS 125 may maintain a unique service profile for each end user. An end user's service profile may store all of the user service information and preferences related to the end user in a central location.

The service broker 115 may also be communicatively coupled with a telephony application server (TAS) 130. The TAS 130 may act as a SIP user agent that maintains a call state. The TAS 130 may contain service logic that provides basic call processing services. The TAS 130 may communicate with the service broker 115 using SIP signaling.

The TAS 130 may also be communicatively coupled to a multimedia analysis and storage application server (MASAS or MAS) 135. The MASAS 135 may support a multimedia session with the communication device 105 to capture multimedia session information. This support may entail performing SIP signaling to set up a bearer channel with the communication device 105. The MASAS 135 may also have the capability to communicate with the communication device 105 over a bearer channel. Bearer capabilities between the MASAS 135 and communication device 105 may need to support include voice, audio, video, data, unrestricted digital, etc. Video capabilities may take the form of H.264, H.263, VC-1, or any other video compression standards that may be run over a protocol that may support video, such as, for example, the real time protocol (RTP).

The MASAS 135 may also be communicatively coupled with a charging collection function (CCF) 140 and a municipal security video monitoring center and archive facility or monitoring and archive facility (MAF) 145. The interface between the MASAS 135 and CCF 140 may be a RADIUS interface commonly used in wireless billing. The CCF 140 may process, correlate, consolidate and record billing information concerning activity occurring in the network 100. The MAF 145 may have two main functions, the MAF 145 may be used to store multimedia session information, and the MAF 145 may be further comprised of a live monitoring center. The archive facility may be used to store multimedia session information, such as, for example, video clips, photographs, voice recordings, or any other storable multimedia information. The stored multimedia sessions may be retrieved at a later time via communication portals the archive facility may support. The live monitoring center may be comprised of authorities that may analyze multimedia session information that is received by the MASAS 135. The authorities may further act upon the received communications sessions by alerting other authorities or take action themselves.

The interface between the MAF 145 and the MASAS 135 may be an interface that allows the MASAS 135 to establish a connection with the MAF 145 and push or send data to the MAF 145. This interface may be a proprietary interface, HTML, SIP, FTP, SNMP, or any other type of interface that allows the MASAS 135 to establish a connection with the MAF 145 and send or push information to the MAF 145. The MASAS 135 may use this interface to send information to the MAF 145 that may be stored and retrieved at a later time. The interface of the MAF 145 may also be used to retrieve multimedia session information from the archive facility of the MAF 145 based on timestamp, geo-location, or subscriber identification number, such as for example, a mobile identification number. The MASAS 135 may be able to establish separate connections with the archive facility and live monitoring facility of the MAF 145.

The MASAS 135 and MAF 145 may be network elements. A network element may be a node in the network 100, a computing board that is part of a node in the network 100, or a process that runs on a board that is part of a node in the network 100. Thus the MASAS 135 and MAF 145 may reside on a same network node, or the MASAS 135 and MAF 145 may reside in separate nodes in the network 100.

The MASAS 135 and the MAF 145 may serve a particular region. A region in this context may be a neighborhood, a city, a county, region of a state, or any other geographical region. A network may be configured such that all multimedia session information that originates from a particular region goes to a particular MASAS and MAF. In an embodiment, the configuration may be such that the MASAS 135 and MAF 145 serve the same region. In alternative embodiments the MASAS 135 or the MAF 145 may serve larger or smaller regions. In an embodiment where a MASAS 135 and MAF 145 serve different sized regions, a MAF may be communicatively coupled to more than one MASAS, or a MASAS may be communicatively coupled to more than one MAF.

As described, the communication device 105 may have to establish a bearer channel with the MASAS 135 to send video to the MASAS 135. The communication device 105 may establish the bearer channel using a SIP signaling protocol when communicating with MASAS 135.

The system 100 in one example comprises a plurality of components such as one or more of computer software components. A number of such components can be combined or divided in the system 100. An example component of the system 100 employs and/or comprises a set and/or series of computer instructions written in or implemented with any or a number of programming languages, as will be appreciated by those skilled in the art. The system 100 in one example comprises a vertical orientation, with the description and figures herein illustrating one example orientation of the system 100, for explanatory purposes.

The system 100 in one example employs one or more computer-readable signal-bearing media. The computer-readable signal-bearing media store software, firmware and/or assembly language for performing one or more portions of one or more implementations of the invention. The computer-readable signal-bearing medium for the system 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Figure 2:
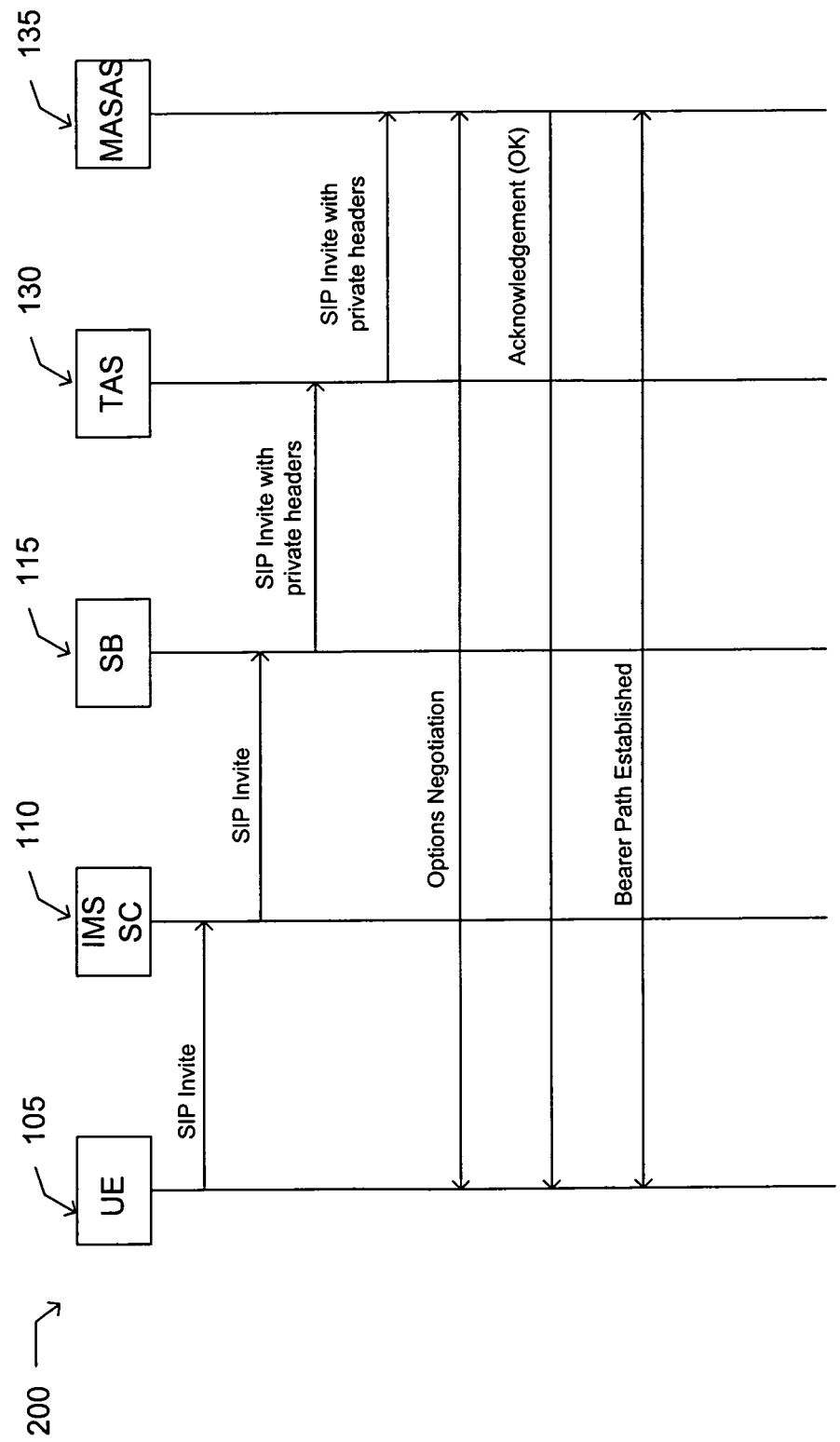
FIG. 2 is a sample call flow of messages that may be sent in support of IMS support for multimedia session recording, analysis and storage.

Turning now to FIG. 2, a sample flow diagram of SIP signaling that may be performed to establish a bearer channel that the communication device 105 may use to send multimedia session information to a MASAS 135. A subscriber carrying a communication device may see suspicious or illegal activity and wish to report and show the activity to local authorities. Likewise, the subscriber may see a dangerous situation, such as a downed power line, and the subscriber may wish to immediately provide municipal authorities with a picture or video of the situation. The subscriber may dial an emergency code, such as, 711, or push an icon that represents the action of notifying local authorities. In such a situation, the communication device 105 may initiate a multimedia SIP session by sending a first SIP Invite message to the IMS-SC 110. Initial filter criteria of the IMS-SC 110 may be set such that when the IMS-SC 110 receives a first SIP Invite message with a dialed code of 711, the IMS-SC 110 may route the first SIP Invite message to the service broker 115.

The service broker 115 may determine that this is a multimedia emergency call based on the on dialed code. The service broker 115 may then query the presence location server 120 to retrieve geo-location information concerning the location of the communication device 105 that sent the first SIP Invite message. Geo-location information may include GPS coordinates, connection location, self-disclosed information, or any other information that may be used to locate the position of the communication device 105. The service broker 115 may also query the HSS 125 to determine communication device 105 capabilities. The communication device 105 capabilities may include information, such as, whether the communication device 105 can support video, whether the communication device 105 is camera enabled, whether the communication device 105 supports color and any other information the HSS 125 may store concerning the capabilities of the communication device 105. The service broker 115 may also get a time stamp, i.e., the current time.

The service broker 115 may place the geo-location information, mobile device capabilities and time stamp in SIP private headers. One of ordinary skill in the art will readily appreciate that a SIP private header is an optional field in a SIP message. Private headers may be used by an IMS application developer to add information to a SIP message. The IMS application developer defines the content and length of the private header. In this case, the private headers may contain geo-location information, mobile device capabilities information and a time stamp. The service broker 115 may send a second SIP Invite message to the TAS 130 where the second SIP invite message is comprised of the first SIP Invite message and the SIP private headers. The second SIP private header may contain geo-location information, mobile device capabilities and a time stamp.

The TAS 130 may forward the second SIP Invite with the private headers to the MASAS 135. The MASAS 135 may store the geo-location, mobile device capabilities and time stamp contained in the private headers of the second SIP Invite. The communication device 105 and MASAS 135 may engage in options negotiations. Since the MASAS 135 now has the address of the communication device 105, the MASAS 135 may address option negotiation messages to the communication device 105. Since the option negotiation messages are addressed to the communication device 105, the other intermediate components in the path of the option negotiation messages may simply route, or pass through, the messages to the next component until the messages get to the communication device 105. Thus the TAS 130, service broker 115 and IMS-SC 110 may pass the option negotiation messages through to the communication device 105.

During options negotiations the communication device 105 and the MASAS 135 may send messages back and forth containing their respective bearer channel capabilities until the MASAS 135 and communication device 105 agree on bearer channel capabilities. Once options negotiations have completed, the MASAS 135 may send a 200 OK message to the communication device 105. At this point, the bearer path may be established. The communications device 105 and the MASAS 135 may now communicate over the bearer channel. In particular, the communication device 105 may send multimedia session information, such as a video of the suspicious activity to the MASAS 135. This may be a one-way communication session where the communication device 105 is sending multimedia session information to the MASAS 135. Once the subscriber is done downloading or sending information to the MASAS 135, the bearer channel may be released.

Once the communication session has ended, the MASAS 135 may send system utilization information related to the call to the CCF 140. System utilization information may include, for example, amount of time spent on a voice channel, the number of bytes sent on a packet channel, or information concerning any type of system resources the subscriber may have used. The CCF 140 may perform further billing analysis on the resource utilization information.

Upon receipt of the multimedia session information the MASAS 135 may heuristically analyze the multimedia session information. As an example of heuristic analysis, the MASAS 135 may perform computer pattern recognition and image analysis on the multimedia session information. Results of the analysis may indicate that urgent emergency circumstances exist. For example, heuristic analysis may indicate that a weapon appears in the video or picture, or the geo-location information, may indicate that the communication session originated in a high crime area. If urgent emergency circumstances exist, the MASAS 135 may forward the multimedia session information to the live monitoring center of the MAF 145 for immediate further analysis by authorities. If heuristic analysis did not find any reason for immediate concern, the MASAS 135 may store multimedia session information at the archive facility located on the MAF 145.

Figure 3:
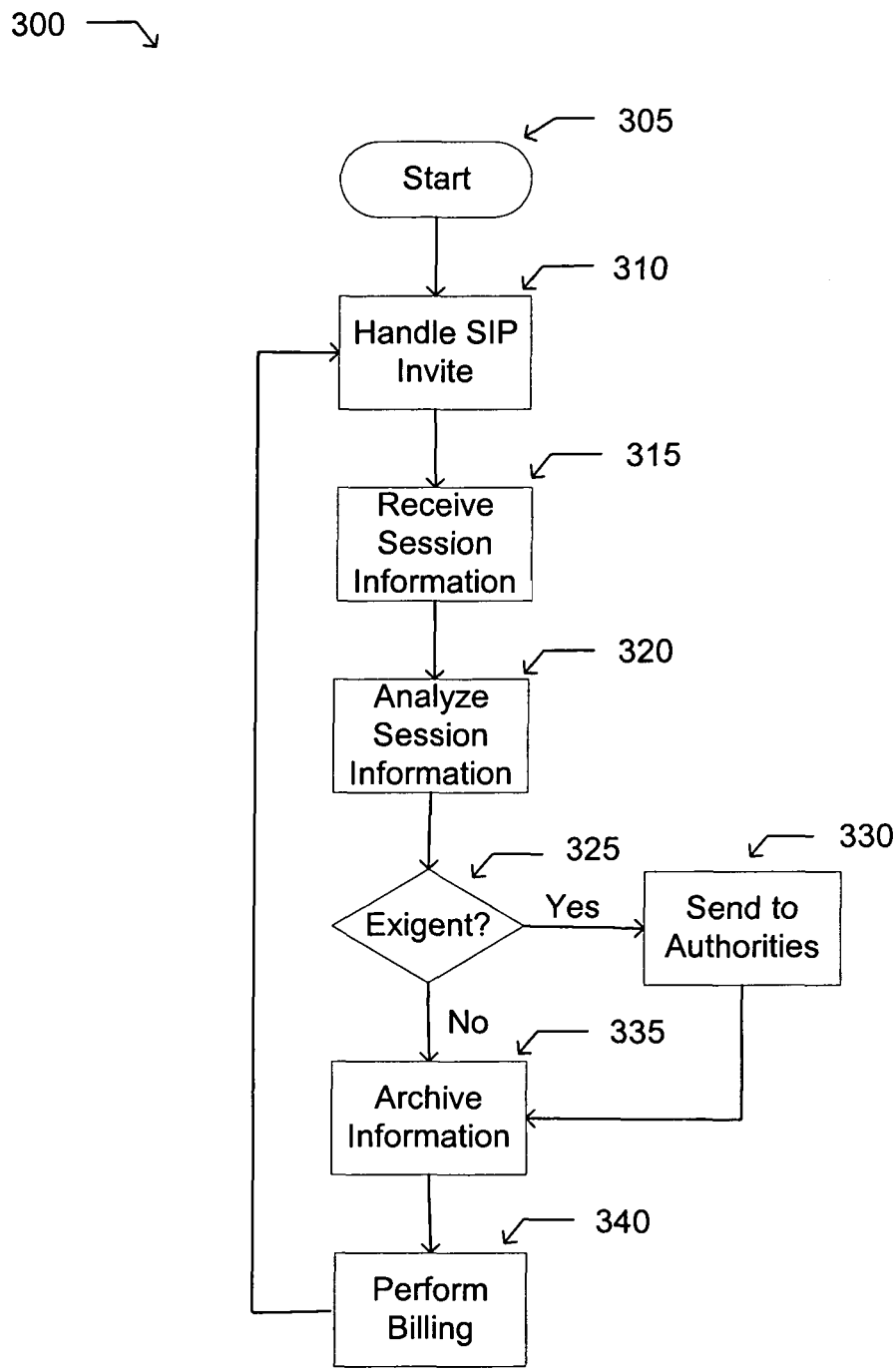
FIG. 3 is a representation of one implementation of a method that may be used to provide IMS support for multimedia session recording, analysis and storage.

Turning now to FIG. 3, which is a flow chart illustrating a method 300 of IMS support for multimedia session recording, analysis and storage. The method 300 may reside on an element in a IMS network, such as, the MASAS 135, or the method 300 may be distributed amongst other elements in an IMS network.

The method 300 begins in a state where it is ready to receive messages 305. Upon receipt of a SIP Invite message, the method 300 handles the SIP Invite message 310. Handling the SIP Invite message 310 may involve storing geo-location information, mobile device capabilities and a time stamp received in the SIP Invite message. The method 300 may negotiate bearer channel capabilities by exchanging SIP options negotiation messages with the communications device 105. Once a bearer channel is established, the method 300 may receive multimedia session information 315 from the communications device 105. The multimedia session information may include video clips, photographs, voice messages, or any other type of information that may be sent over a bearer channel. The multimedia session information may be related to suspicious activity seen by a subscriber, which the subscriber wants to report to local authorities.

The method 300 may heuristically analyze the multimedia session information 320 to determine if urgent emergency circumstances exist 325. If urgent emergency circumstances exist, the method may establish a connection to authorities at the live monitoring center and forward the multimedia session information to authorities at the live monitoring center 330. Authorities at the live monitoring center may further analyze the multimedia session information and act upon the information. Simultaneously or subsequently, the multimedia session information may be stored in the archive facility 335. The method 300 may then perform billing functions 340 and continue waiting for SIP Invite messages 310. In performing billing functions, the method 300 may send system utilization information to the CCF 140. The CCF 140 may perform further billing analysis on the resource utilization information.

If the urgent emergency circumstances do not exist, the method may store the multimedia session information in the archive facility 335. The method may then continue waiting for SIP Invite messages.

The steps or operations described herein are just for example. There may be many variations to these steps or operations without departing from the spirit of the system and method. For instance, the steps may be performed in a differing order, or steps may be added, deleted, or modified.

Although example implementations of the system and method have been depicted and described in detail herein, it will be apparent to those skilled in the relevant art that various modifications, additions, substitutions, and the like can be made without departing from the spirit of the method and these are therefore considered to be within the scope of the system and method as defined in the following claims.

We claim:

1. A system comprising:
a first network element configured to
exchange session initiation protocol (SIP) signaling messages with a mobile communications device to establish a bearer channel;
receive, from the mobile communications device via the bearer channel, multimedia session information captured by the mobile communications device;
analyze the multimedia session information for urgent emergency circumstances, wherein the multimedia session information comprises at least one of video, pictures and voice messages; and
forward the multimedia session information to a destination for further analysis when the first network element determines that the multimedia information indicates emergency circumstances;
a second network element communicatively coupled to the first network element, wherein the destination is a live monitoring center on the second network element; and
an Internet Protocol Multimedia Subsystem (IMS) comprising
an IMS session control node,
a service broker configured to retrieve geo-location information from a presence location server and bearer capabilities from a home subscriber server, and
a telephony application server;
wherein the first network element is communicatively coupled to the telephony application server, and wherein the first network element is configured to establish the bearer channel with the mobile communications device via the exchange of the SIP signaling messages through the IMS session control node, the service broker, and the telephony application server.

2. The system of claim 1 wherein:
the first network element is a multimedia analysis and storage application server; and
the second network element is a municipal security video monitoring center and archive facility.

3. The system of claim 2
wherein the mobile communications device is communicatively coupled to the IMS session control node; and
wherein the service broker is communicatively coupled to the IMS session control node, the home subscriber server, and the presence location server; and
wherein the telephony application server is communicatively coupled to the service broker.

4. The system of claim 3 wherein the IMS session control node, the service broker, the presence location server, the home subscriber server, the telephone application server, and the multimedia analysis and storage application server are configured to communicate via the session initiation protocol.

5. The system of claim 3 wherein when a subscriber dials a 711 code or pushes an icon on the mobile communications device, the mobile communications device sends a first session initiation protocol invite message to the IMS session control node; and
wherein the IMS session control node is configured to recognize the dialed code of 711 and route the first session initiation protocol invite message to the service broker; and
wherein upon receipt of the first session initiation protocol invite message the service broker is configured to create a time stamp, retrieve the geo-location information of the mobile communications device from the presence location server, retrieve the bearer capabilities for the mobile communications device from the home subscriber server, and place the time stamp, the geo-location information and the bearer capabilities in headers of a second session initiation protocol invite message and send the second session initiation protocol invite message to the telephony application server.

6. The system of claim 5 wherein the telephony application server is configured to forward the second session initiation protocol invite message to the multimedia analysis and storage application server, and wherein the multimedia analysis and storage application server is configured to create the bearer channel with the mobile communications device, and wherein the bearer channel supports a video compression standard that is at least one of H.264, H.263 or VC-1.

7. The system of claim 6 wherein the multimedia analysis and storage application server is configured to perform session initiation protocol options negotiations with the mobile communications device; and
wherein the multimedia analysis and storage application server is configured to support video bearer capabilities; and
wherein the multimedia analysis and storage application server is configured to use the bearer capabilities contained in the private headers of the second session initiation protocol invite message to begin session initiation protocol options negotiations.

8. The system of claim 3 further comprising a charging collection function communicatively coupled to the multimedia analysis and storage application server wherein upon completion of a multimedia session, the multimedia analysis and storage application server is configured to send resource utilization records to the charging collection function.

9. The system of claim 3 wherein when the multimedia analysis and storage application server determines through a heuristic analysis that the multimedia session information comprises information that indicates the emergency circumstances exist, the multimedia analysis and storage application server is configured to forward the multimedia session information to the live monitoring center for further live analysis by authorities, and wherein the authorities comprises at least one of police, security or municipal authorities.

10. The system of claim 9 wherein the heuristic analysis comprises at least one of pattern recognition or image analysis performed on the multimedia session information.

11. The system of claim 10 wherein the multimedia session information is retrieved by at least one of a time stamp, the geo-location information and mobile identification from the municipal security video monitoring center and archive facility; and
wherein the municipal security video monitoring center and archive facility is configured to support a protocol that allows multimedia session information to be stored and retrieved from the municipal security video monitoring center and archive facility.

12. The system of claim 3 wherein the multimedia analysis and storage application server is configured to forward the multimedia session information to the live monitoring center when a heuristic analysis reveals the urgent emergency circumstances exist in the multimedia session information; and
wherein the multimedia analysis and storage application server is configured to forward the multimedia session information to the live monitoring center when the geo-location information indicates the multimedia session information originated from a high crime area.

13. The system of claim 12 wherein the municipal security video monitoring center and archive facility further comprises an archive facility, and wherein the multimedia analysis and storage application server is configured to forward the multimedia session information to the archive facility.

14. The system of claim 3 wherein the multimedia analysis and storage application server and the municipal security video monitoring center and archive facility are configured to serve a region.

15. A method comprising the steps of:
exchanging, by a first network element, session initiation protocol (SIP) signaling messages with a mobile communications device to establish a bearer channel;
receiving, from the mobile communications device via the bearer channel, multimedia session information at the first network element captured by the mobile communications device, wherein the multimedia session information comprises at least one of video, pictures and voice messages;
analyzing, via the first network element, the multimedia session information to determine when the multimedia session information comprises urgent emergency circumstances; and
sending, via the first network element, the multimedia session information to a live monitoring center of a second network element communicatively coupled with the first network element when the first network element determines that the multimedia session information indicates the urgent emergency circumstances exist;
wherein the first network element establishes the bearer channel with the mobile communications device via the exchange of the SIP signaling messages through an Internet Protocol Multimedia Subsystem (IMS) session control node, a service broker configured to retrieve geo-location information from a presence location server and bearer capabilities from a home subscriber server, and a telephony application server of an IMS system.

16. The method of claim 15 further comprising:
handling a first session initiation protocol invite message; and
archiving the multimedia session information;
wherein the second network element is a municipal security video monitoring storage and archive facility.

17. The method of claim 16 wherein the handling the first session initiation protocol invite message further comprises determining a dialed code in the session initiation protocol invite message and retrieving the geo-location information from the presence location server, the bearer capabilities from the home subscriber server and creating a time stamp when the dialed code is 711 and placing geo-location information, the bearer capabilities and the time stamp into private headers of a second session initiation protocol invite message.

18. The method of claim 16 wherein the first network element is a multimedia analysis and storage application server that receives the multimedia session information and the multimedia analysis and storage application server sets up the bearer channel to the mobile communications device.

19. The method of claim 16 wherein the analyzing, via the first network element, the multimedia session information further comprises analyzing, via the first network element, the multimedia session information using a heuristic analysis, wherein the heuristic analysis comprises at least one of pattern recognition or image analysis performed on the multimedia session information.

20. The method of claim 16 wherein archiving the multimedia session information further comprises sending the multimedia session information to the municipal video monitoring storage archive facility.

* * * * *